(12) United States Patent
Knight

(10) Patent No.: US 10,723,527 B2
(45) Date of Patent: Jul. 28, 2020

(54) DISPENSING CLOSURES AND DISPENSERS

(71) Applicant: RIEKE PACKAGING SYSTEMS LIMITED, Leicestershire (GB)

(72) Inventor: Simon Christopher Knight, Bridgend (GB)

(73) Assignee: RIEKE PACKAGING SYSTEMS LIMITED (GB)

(*) Notice: Subject to any disclaimer, the term of this patent is extended or adjusted under 35 U.S.C. 154(b) by 0 days.

(21) Appl. No.: 16/377,559

(22) Filed: Apr. 8, 2019

(65) Prior Publication Data

US 2019/0233180 A1    Aug. 1, 2019

Related U.S. Application Data

(63) Continuation-in-part of application No. 15/489,898, filed on Apr. 18, 2017, and a continuation of (Continued)

(51) Int. Cl.
*B65D 47/20* (2006.01)
*B65D 47/32* (2006.01)
(Continued)

(52) U.S. Cl.
CPC ..... *B65D 47/2031* (2013.01); *B65D 47/2081* (2013.01); *B65D 47/32* (2013.01);
(Continued)

(58) Field of Classification Search
CPC . B65D 47/2031; B65D 51/1683; B65D 47/32
(Continued)

(56) References Cited

U.S. PATENT DOCUMENTS 3,981,419 A    9/1976 Nilson
4,474,314 A * 10/1984 Roggenburg, Jr. .......... B65D 47/2081 222/147

(Continued)

FOREIGN PATENT DOCUMENTS

DE    19510007 A1    10/1995

OTHER PUBLICATIONS

International Search Report and Written Opinion dated Aug. 31, 2016; International Application No. PCT/GB2016/051187 filed on Apr. 27, 2016. ISA/EP.

*Primary Examiner* — Vishal Pancholi
(74) *Attorney, Agent, or Firm* — McDonald Hopkins LLC

(57) ABSTRACT

A dispensing closure for dispensing fluid product from a squeeze container consists of an outer cap element (3) and an inner element or valve disc (4) fitting inside the cap element. Each is moulded from thermoplastics; no elastomer is used. The cap element includes an outwardly-deflectable diaphragm wall (35) around a central outlet opening (361). The inner element (4) has a peripheral mounting ring (41), a central blocking portion (48) and a set of support spokes (46) providing flow clearance between them. In a closed position the blocking portion closes the outlet opening. In an outflow condition the diaphragm wall (35) deflects outwardly to allow flow. In a recovery mode the blocking portion (48) deflects inwardly for compensation air or residual liquid product to enter the container.

16 Claims, 13 Drawing Sheets

Related U.S. Application Data application No. 15/577,541, filed as application No. PCT/GB2016/051187 on Apr. 27, 2016, now Pat. No. 10,252,841, said application No. 15/489,898 is a continuation of application No. PCT/GB2015/053127, filed on Oct. 20, 2015.

(60) Provisional application No. 62/167,622, filed on May 28, 2015, provisional application No. 62/066,011, filed on Oct. 20, 2014.

(51) Int. Cl.
    *B65D 51/16*     (2006.01)
    *F16K 7/17*     (2006.01)
    *F16K 15/14*     (2006.01)

(52) U.S. Cl.
    CPC ............ *B65D 51/1683* (2013.01); *F16K 7/17* (2013.01); *F16K 15/147* (2013.01)

(58) Field of Classification Search
USPC ....... 222/213, 380, 387, 490, 493, 494, 520, 222/521
See application file for complete search history.

(56) References Cited

U.S. PATENT DOCUMENTS

| | | |
|---|---|---|
| 4,506,809 A | 3/1985 | Corsette |
| 5,680,969 A | 10/1997 | Gross |
| 5,692,651 A | 12/1997 | Fuchs |
| 5,938,086 A | 8/1999 | Gross |
| 6,095,382 A | 8/2000 | Gross |
| 6,112,952 A | 9/2000 | Hess et al. |
| 6,332,730 B1 | 12/2001 | Taghavi-Khanghah |
| 2005/0087571 A1 | 4/2005 | Dark |
| 2005/0184075 A1 | 8/2005 | Belcasro |
| 2006/0138179 A1 | 6/2006 | Suffa |

\* cited by examiner

DISPENSING CLOSURES AND DISPENSERS

CROSS REFERENCE TO RELATED APPLICATIONS

This application is a continuation of Ser. No. 15/577,541 filed on Nov. 28, 2017 which is both: (1) 35 U.S.C. 371 national stage filing and claims priority to pending International Application No. PCT/GB2016/051187 filed on Apr. 27, 2016, entitled "DISPENSING CLOSURES AND DISPENSERS," which claims the benefit of U.S. Provisional Patent Application No. 62/167,622 filed on May 28, 2015 (while also associating International Application No. PCT/GB2015/053127 filed on Oct. 20, 2015, and British Application No. 1601237.9 filed on Jan. 22, 2016 in the priority data provided for the pending International Application); and (2) a continuation-in-part of pending U.S. application Ser. No. 15/489,898 filed on Apr. 18, 2017 which claims the benefit of now-expired International Application NO. PCT/GB2015/053127 filed on Oct. 20, 2015 which, itself, claims the benefit of U.S. Provisional Application No. 62/066,011 filed on Oct. 20, 2014. Each of the foregoing applications are incorporated by reference herein.

FIELD OF THE INVENTION

This invention relates to dispensing closures for dispensing liquid products from containers, and to dispensers comprising such a closure mounted on or comprised in a product container. The proposals relate particularly but not exclusively to dispensing closures for squeeze dispensers, in which the container is resiliently squeezable to force product out through an outlet path defined through the closure, and subsequently recovers drawing compensation air back into the container. The invention is particularly concerned with valved closures, in which the closure includes a valve device which opens the outflow path for dispensing and closes it when dispensing pressure is relieved. A valve action may offer various advantages, such as protecting the product in the container against contamination and giving a clean cut-off of dispensed flow when squeezing is relaxed.

BACKGROUND

Cross-slit silicone valves are widely used for this purpose: an inwardly-convex silicone rubber dome with a cross-shaped slit is mounted in the outlet opening. Under dispensing pressure it inverts (bulges outwardly) and the slits open up for flow. When pressure is relieved the elastomer dome flips rapidly back to its original form, closing the slits. Flow is cut off, and on recovery compensation air can enter (with some product suck-back) because little pressure difference is needed to open the slits for some reverse air flow. These slit silicone valves work well, but the silicone elastomer is expensive, and neither recyclable nor degradable.

The Invention

Our aim herein is to provide new and useful types of valved dispensing closure, and corresponding dispensers comprising them, especially with a view to providing a mechanism that requires neither special elastomer materials nor auxiliary springs and the like.

Earlier Application

Our earlier patent application U.S. 62/066,011 filed 20 Oct. 2014 (subsequently published via PCT/GB2015/053127 of 20 Oct. 2015 claiming its priority) describes earlier versions of the present proposals. For the avoidance of doubt: the definitions of our proposals herein may be adjusted to exclude subject-matter specifically disclosed in the earlier application in the event that it forms part of the state of the art (prior art) under law. To establish a clear basis for any such exclusion, the contents of the earlier application are set forth herein subsequently. In jurisdictions where that subject-matter is not prior art, it constitutes further supporting disclosure. It is additionally to be regarded as incorporated herein by reference.

According to our proposals a dispensing closure, for dispensing fluid product from a container thereof, comprises a closure valve with an outer element and an inner element. The outer element comprises an outwardly-deflectable diaphragm wall around an outlet opening, the outlet opening being included in an outflow path defined by the closure, and there being an annular surround portion around the outlet opening. The inner element is positioned inwardly of the outer element and comprises a blocking portion and a support structure mounting the blocking portion in the closure, aligned with the outlet opening and to the inner side thereof. The closure defines flow clearance past the inner element i.e. around and/or through it. The blocking portion is inwardly deflectable, by movement of the support structure in the closure.

In a closed position of the valve, which typically corresponds to a passive condition without substantial excess pressure from outside or inside, the blocking portion takes a relatively outward (upward) position and closes the outflow path, preferably by contact against the annular surround of the outlet opening. The outlet opening may be formed directly in the outer element's diaphragm wall. Desirably in this condition resilience of one or both of the inner and outer elements, arising preferably from pre-tensioning of the diaphragm wall and/or of the support structure for the blocking portion, urges the components to a sealed condition with the blocking portion positively urged to close the outflow path.

Under positive dispensing pressure from the inside, e.g. on squeezing a container containing the product, the valve is operable in an outflow condition in which the diaphragm wall of the outer element deflects outwardly, lifting it away from the blocking portion which then no longer blocks the outflow path/outlet opening. Product flows out through the closure through the aforementioned flow clearance, around the blocking portion and out through the outlet opening.

Finally, the valve is operable in a recovery or venting mode in which an excess of pressure exists outside the valve, such as when a squeezed container recovers its volume after dispensing and reduces the internal container pressure. The blocking portion deflects inwardly under the differential pressure, typically by flexing of the support structure, and opens or relaxes the seal of the outflow path/outlet opening which is made in the closed condition, allowing compensation air to enter the container. If residual liquid product is present at the outlet opening, this may be sucked back in through the closure.

We particularly prefer that the inner element and the outer element are non-elastomeric. They may be made from thermoplastic material, such as polypropylene which is both economical and recyclable. They may be separate parts.

The outlet opening may be surrounded by the diaphragm wall and preferably is centrally positioned in it. Desirably the diaphragm wall is generally circular. It is preferably substantially flat in the rest (closed) condition, although it may be "dished" inwards or outwards, preferably at not more than 20°, or not more than 10°, from its edge to the opening's surround portion, in that condition. Most preferably the outer element comprises the diaphragm wall as part of a cap form, especially as the top/outer wall of a cap. The cap may include a closure surround with formations for connecting to a container neck, for example a downward skirt with retaining formations—usually radially inwardly directed, but this depends on the container design—such as thread or snap formations, for engaging the container neck. The diaphragm wall is desirably moulded in one piece with the rest of the cap component; it may be a relatively thin portion therein. Preferably it is the outermost wall of the closure, i.e. the last part traversed by liquid dispensed. An outer cap, lid or plug may be provided and desirably has a plug portion that pushes down (inwardly) on the diaphragm wall and/or blocks the outlet opening in the closed position. Such an outer cover may be moulded integrally with the outer element or formed as a discrete element.

Preferably a support structure of the inner element is mounted to (or in) the outer element, so that the closure is an integrated device. The inner element is desirably a push fit up inside the outer element. It may have an annular mounting formation, such as an outwardly-directed edge or retaining ring, which may engage in a corresponding inwardly-directed retaining formation of the outer element. The inner element is desirably a generally circular component. Preferably the annular mounting formation includes an outward flange that extends below an inwardly-directed stiff portion of the outer element, generally a downwardly-facing cap surround portion, to lie between this and the edge of the container neck in the assembled dispenser. This may provide a seal, obviating a discrete gasket at this position. It holds the inner element securely in position so that it cannot fall into the container under a heavy impact or a push through the outlet. It can also locate the inner element rotatably on a production line.

Where the outlet opening is central, the blocking portion in a circular component is then supported generally centrally in the circular inner element, and may be in the form of a disc or plate or a formation on a disc or plate. Desirably the blocking portion has an outwardly-directed sealing surface, such as an annular surface, shaped and dimensioned to make a seal closing the outflow path, such as a seal against the annular surround portion on the inside of the outlet opening, and preferably with resilient force as mentioned above. Thus, the blocking portion may consist of a circular region, which may be an outward eminence, on a central plate or disc of the inner element.

The blocking portion is desirably supported relative to an outer fixing part of the support structure via one, two or more flexible limbs so that it is inwardly deflectable as described above. The thinner/longer and hence more readily flexible these limbs, the smaller the force required to open the valve for reverse flow e.g. for air venting or product suck-back. So, the number and structure of one or more support limbs for the blocking portion can be designed taking account of the suction forces expected from the container and the viscosity of the intended product, which may need to be sucked back.

For the outflow (dispensing) situation the more easily deflected the outer diaphragm wall, the larger the flow opening that can be opened up and the faster the available dispensing outflow.

Various refinements can be made in the structure to improve the selective operation of the valve. Firstly, on outflow, the diaphragm wall should deflect out and away from the blocking portion to open the outflow path. For this, the blocking portion and support structure should not be deflected outwardly together with the diaphragm wall. One way to assure this is to make the blocking portion/support structure a relatively more open structure i.e. the flow clearance past them should be substantially larger than the outlet opening size at/through the diaphragm wall. This is readily arranged, typically by supporting the blocking portion via one or more spoke or limb formations as described above which provide substantial surrounding or intervening flow clearance. Also, the support structure for the blocking portion should not be excessively flexible: this is easily determined by testing.

On the recovery stroke the reverse pressure difference may tend to make the diaphragm deflect inwardly together with the blocking portion and this may prejudice opening or relaxing of the seal for venting/suck-back. It is preferred to have a more selective valve action. For this purpose, the closure may comprise one or more support or prop structures underlying the diaphragm wall, to inhibit its inward deflection. Such prop or support structure(s) may for example be formed integrally with the diaphragm wall and outer element, and/or integrally with the inner element beneath. The diaphragm wall is generally a thin component, so we prefer to form one or more prop formations projecting up from the inner element at a non-deflecting portion thereof, e.g. on or adjacent an annular periphery thereof. The one or more prop formations may contact against the underside of the diaphragm wall in the rest condition. Their inhibition of inward deflection of the diaphragm wall can significantly improve the venting/suck-back performance.

Since the diaphragm wall is preferably non-elastomeric, it may be formed with three-dimensional contouring to increase its restoring force when deflected (bent) out of position.

The annular surround portion at the outlet opening may comprise a downward annular seal projection, as mentioned before. The edge form of this is desirably shaped to complement the surface it meets beneath, e.g. the outer side of the blocking portion, in the closed condition. Additionally or alternatively, the annular surround portion may project outwardly from the wall as an outlet tube or nozzle. Such an annular surround portion, such as an outlet tube or nozzle, generally has a thicker wall than the diaphragm wall itself. It may act to collect and direct the outflow.

For good sealing in preferred versions the annular surround portion at the outlet opening should remain coaxial with the blocking portion i.e. not tilt out of alignment. It is preferred to provide three-dimensional contouring or reinforcement of the diaphragm wall adjacent the annulus surround portion to inhibit tilting. This may comprise for example an annular upward and/or downward bulge formation or part-torus formation of the diaphragm wall extending around the annular surround portion.

A further optional refinement, as disclosed in our provisional U.S. patent application 62/167,622 of 28 May 2015 the priority of which is claimed herein, is that the blocking portion carries a vent post projecting through and preferably beyond (outside) the outlet opening. This feature, which may be of interest with certain kinds of products, allows a user to open the valve by pushing down on the vent post e.g. so as to be able to smell a product without dispensing any of it.

Particular structures disclosed in the earlier application which may be excluded herein include those in which the diaphragm wall is an outwardly-convex wall which has plural facets and/or is inclined outwardly at more than 20° from its edge to the annular surround portion.

The dispensing closures and dispensers disclosed herein are suitable for use with a wide range of liquid products. Relevant product types include watery liquids, creams and foams, cleaning products such as detergents, food products and food additives such as sauces, condiments, ketchup, mustard and the like, also toiletries and cosmetics.

As mentioned the closures are well suited for use with squeeze containers, although in principle they will work in any kind of dispenser which generates forward pressure for dispensing, such as by a pump.

A cap component comprised in or constituted by the outer element may be screwed or snapped onto or into a neck of a container. By means of the present proposals, a valved dispenser pack can be made from the container and only two components for the closure, both of which can be fully recyclable if made from suitable material such as polypropylene. Testing has confirmed that bi-directional valve action for dispensing and venting/suck-back is achievable without the need for any elastomer component or separate spring.

Embodiments of our proposals are now described with reference to the accompanying drawings, in which FIG. 1 is an exploded view of a first dispensing closure embodying our proposals;

Figure 6A:
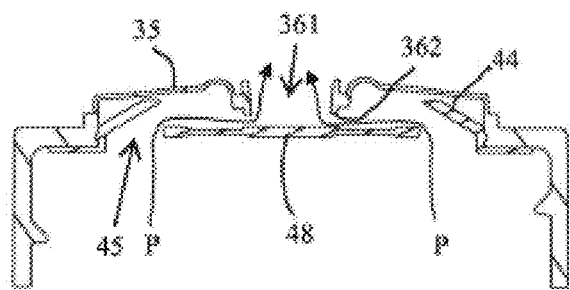
Figure 6B:
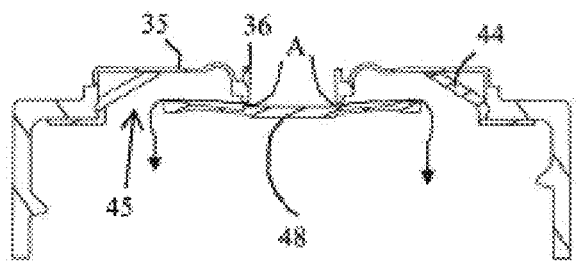
Figure 7:
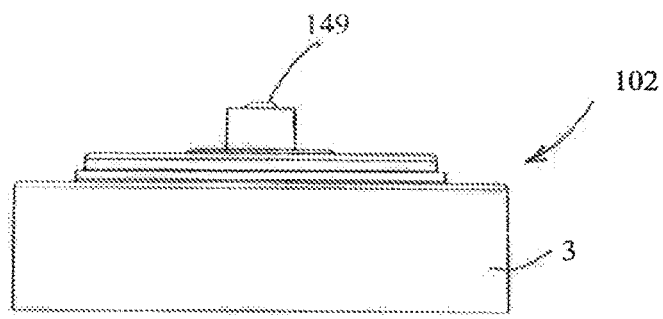
Figure 8:
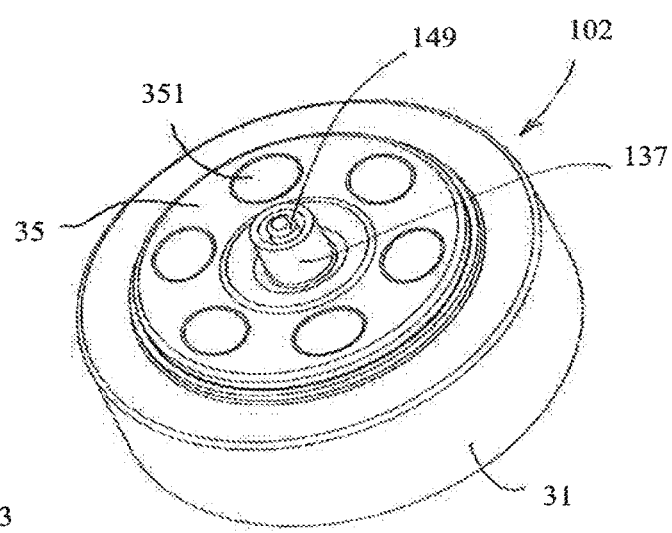
Figure 9:
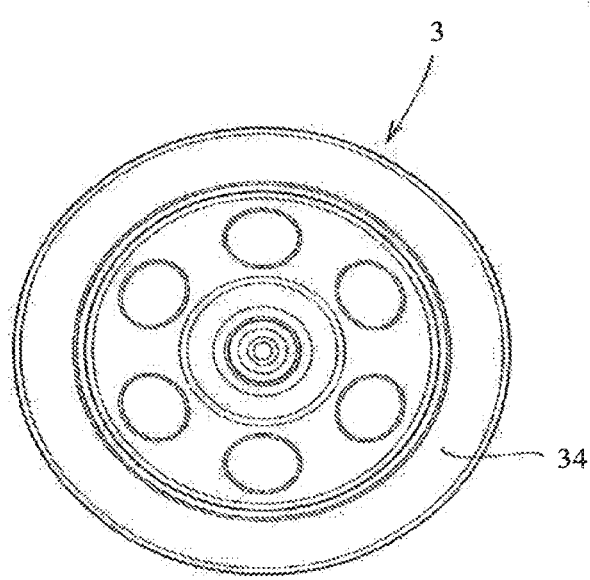
Figure 10:
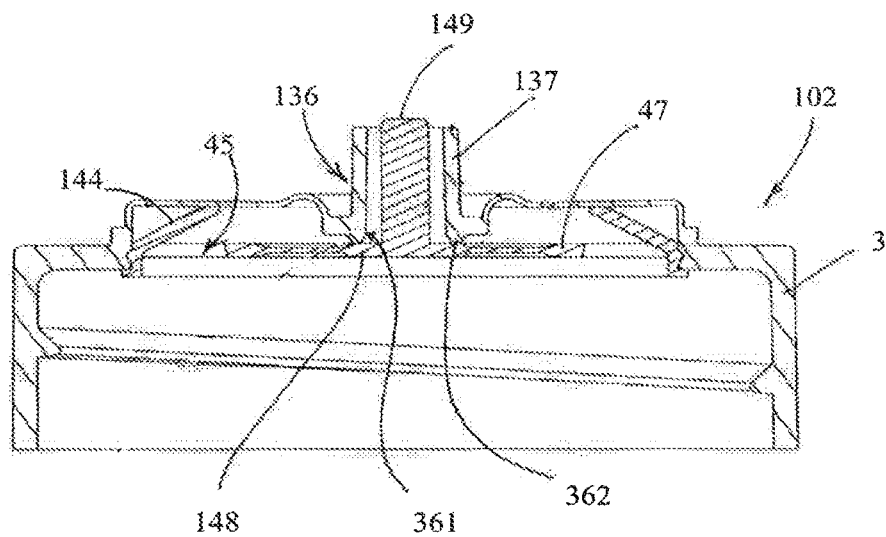
Figure 11:
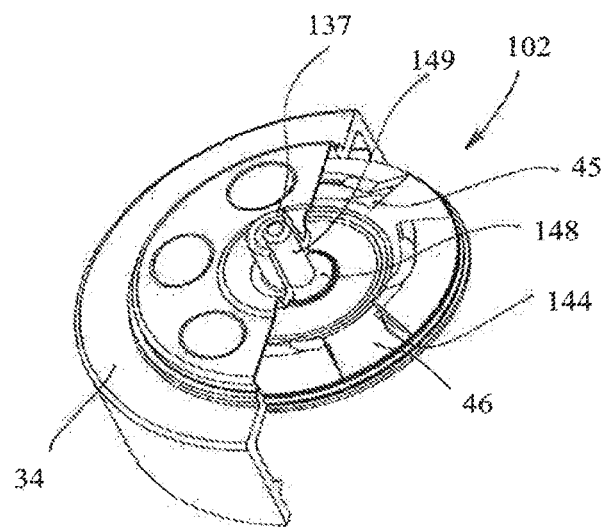
Figure 12:
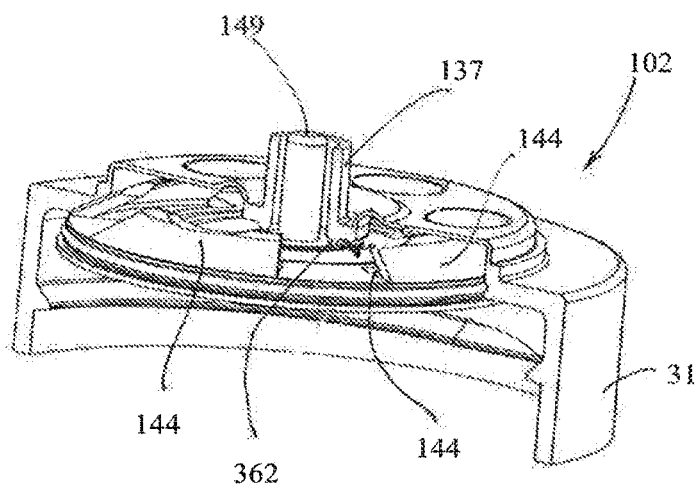
Figure 13:
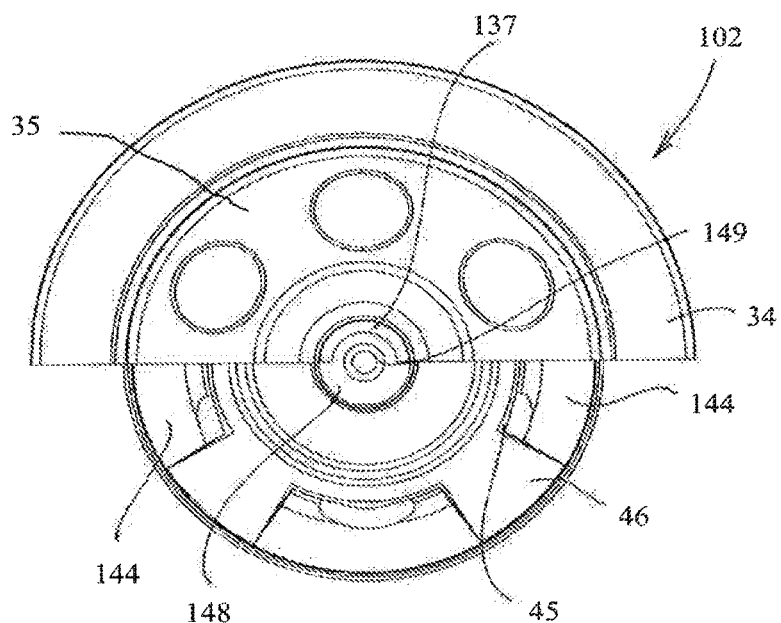
Figure 14:
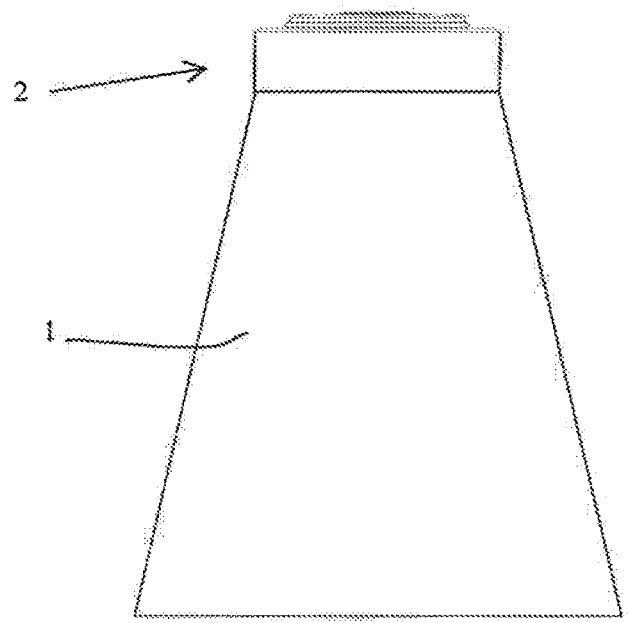
Figure 15:
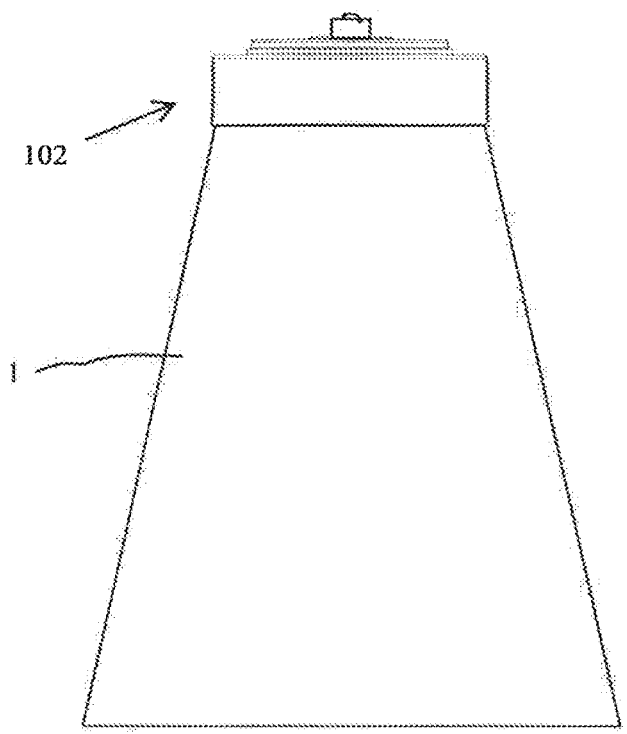

FIGS. 6(a) and (b) show respectively the positions of the components in the outflow and recovery conditions;

FIGS. 7, 8 and 9 are respectively a side view, oblique view and top view of a second embodiment of closure;

FIG. 10 is a somewhat enlarged diametric cross-section of the second embodiment;

FIGS. 11, 12 and 13 are respectively a perspective view at a steep angle, a perspective view at a shallow angle and a plan view of the second embodiment with half of the outer element broken away to show the relationship of parts, and FIGS. 14 and 15 are side views of dispensers comprising the closures of the first and second embodiments.

Figure 16:
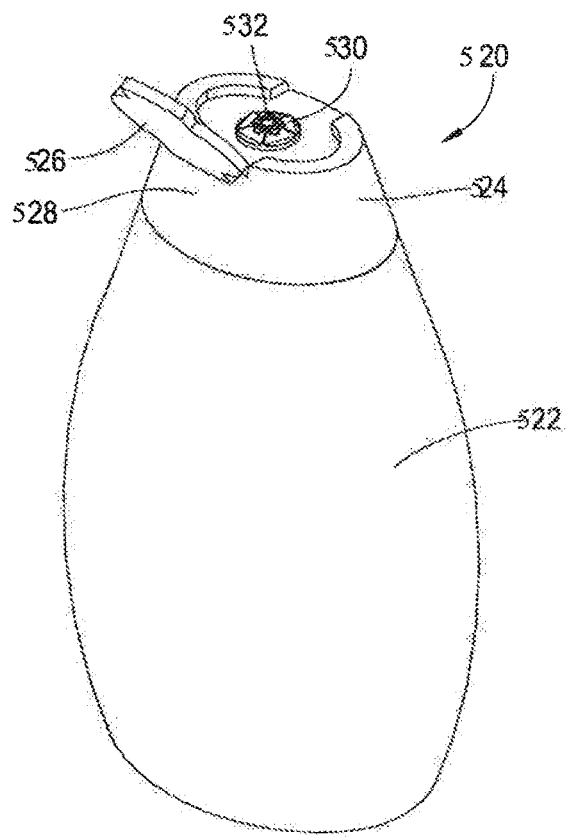
Figure 17:
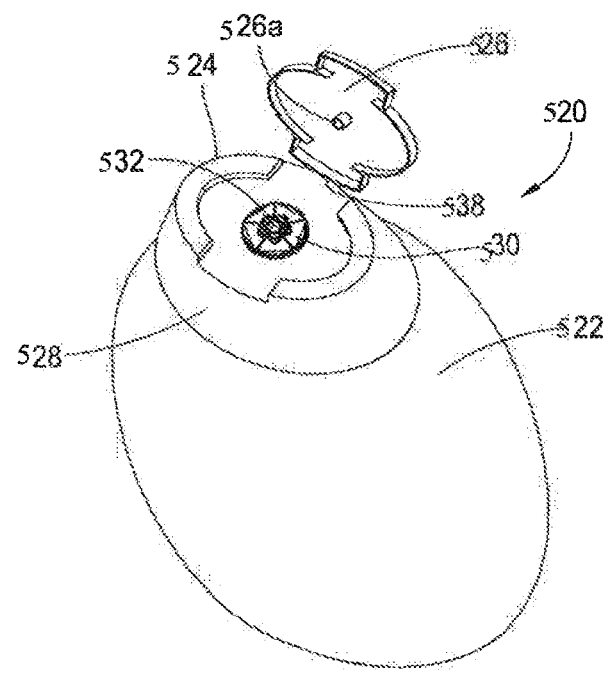
Figure 18:
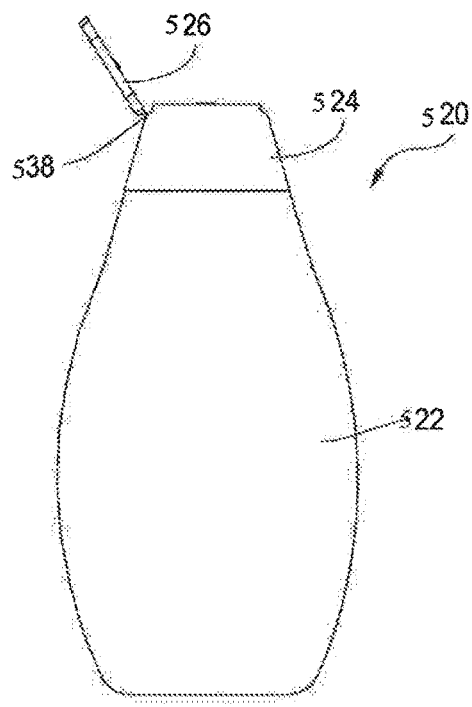
Figure 19:
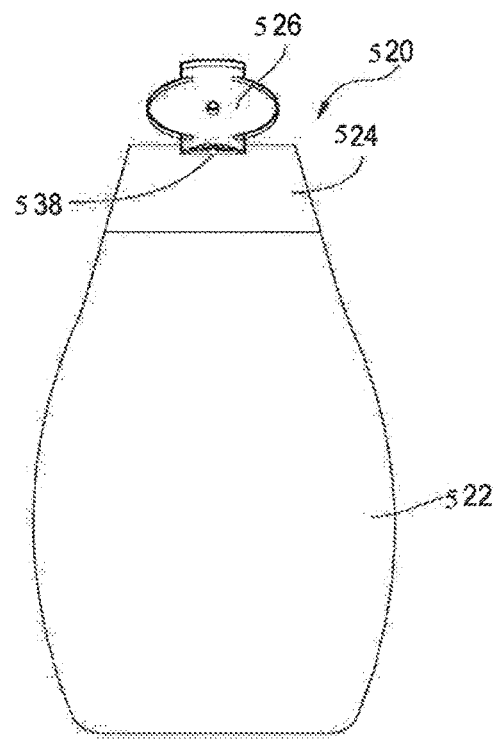
Figure 20:
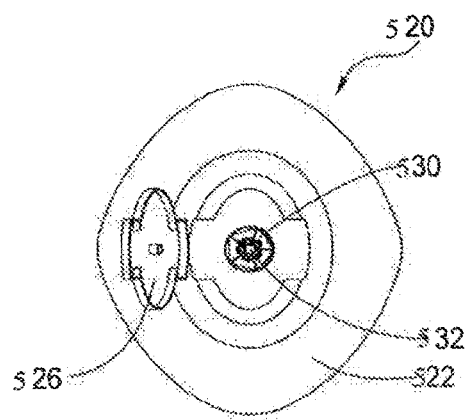
Figure 21:
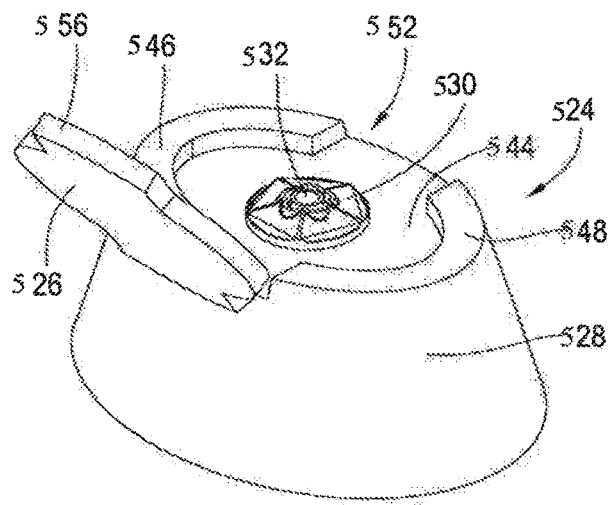
Figure 22:
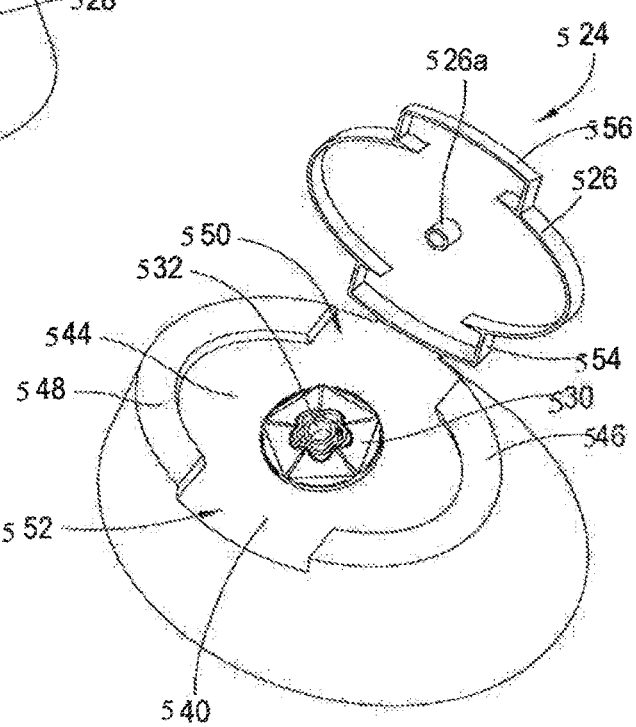
Figure 23:
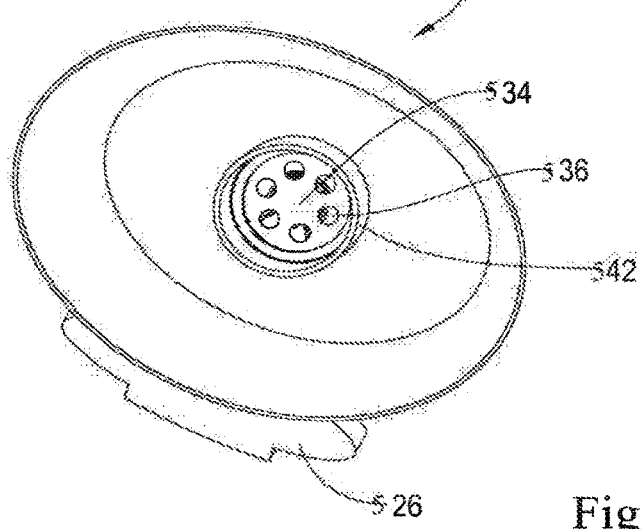
Figures 24, 25, 26:
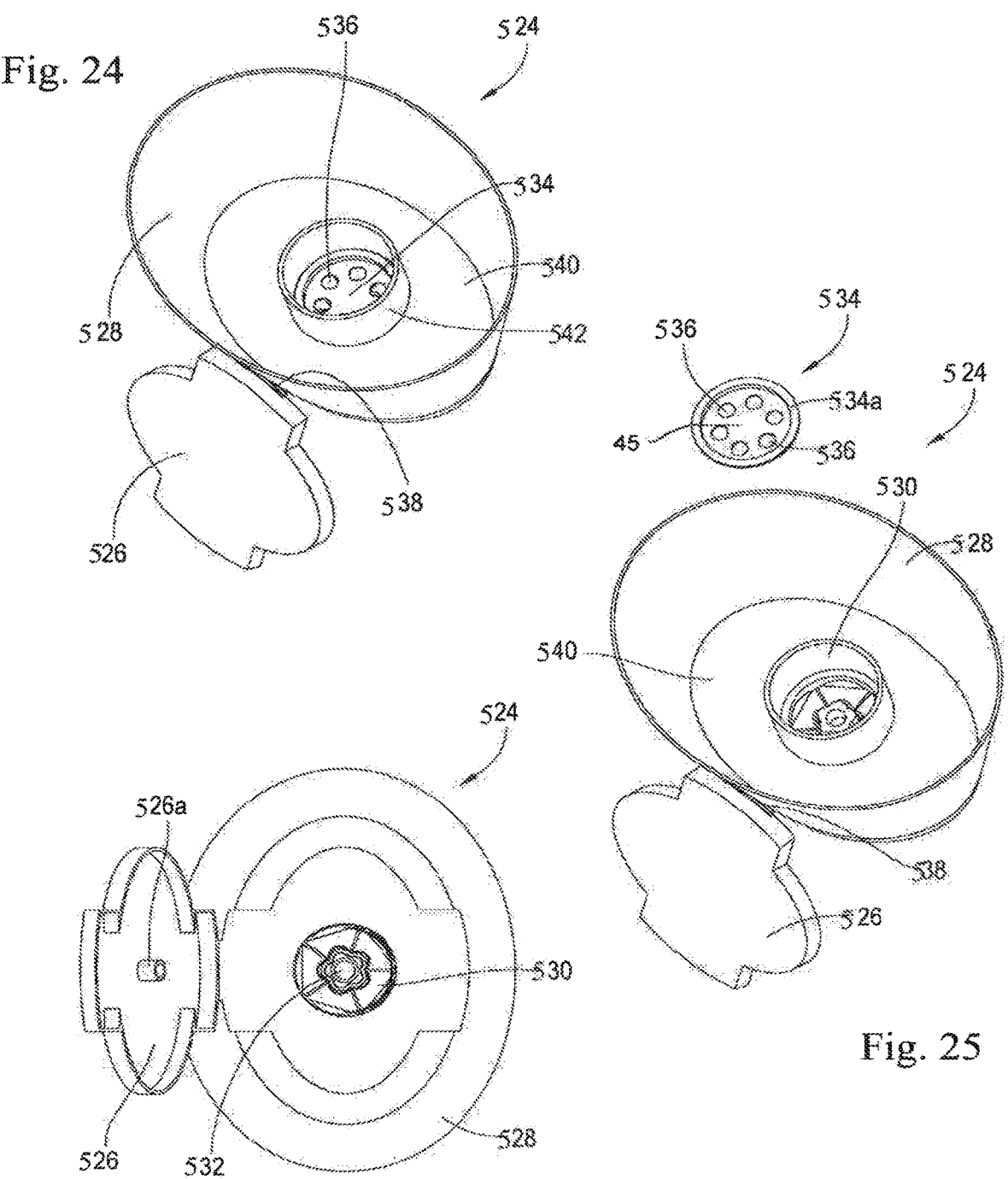
Figure 27:
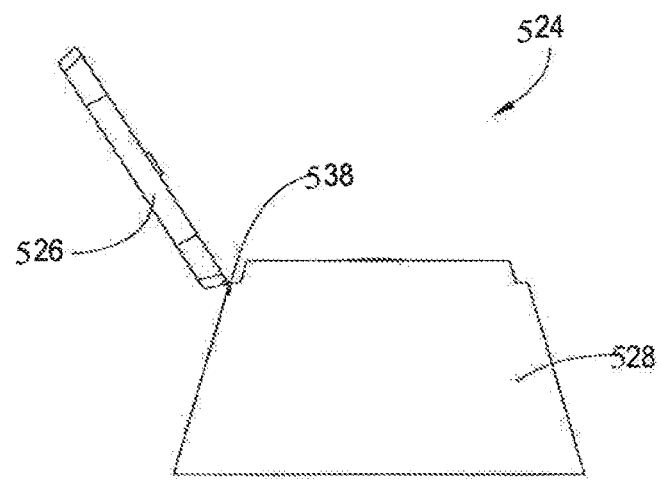
Figure 28:
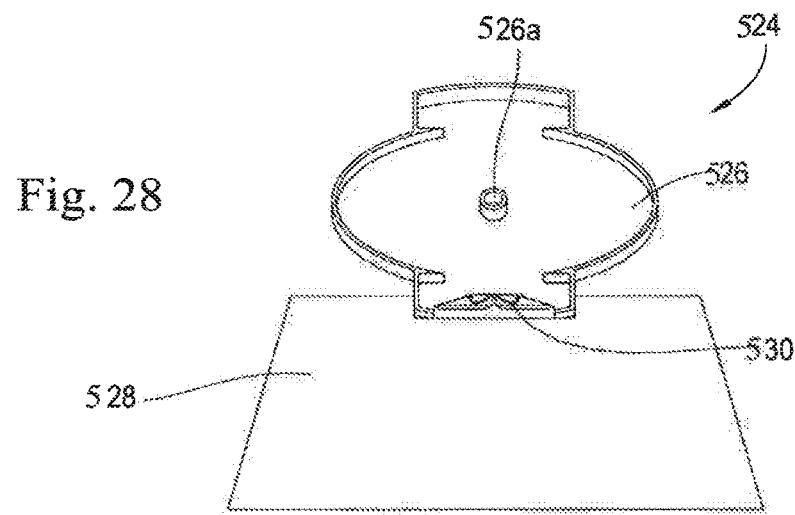
Figure 29:
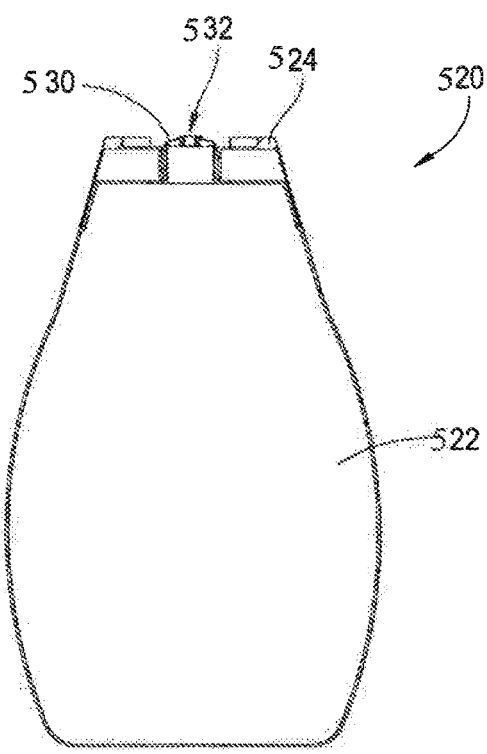
Figure 30:
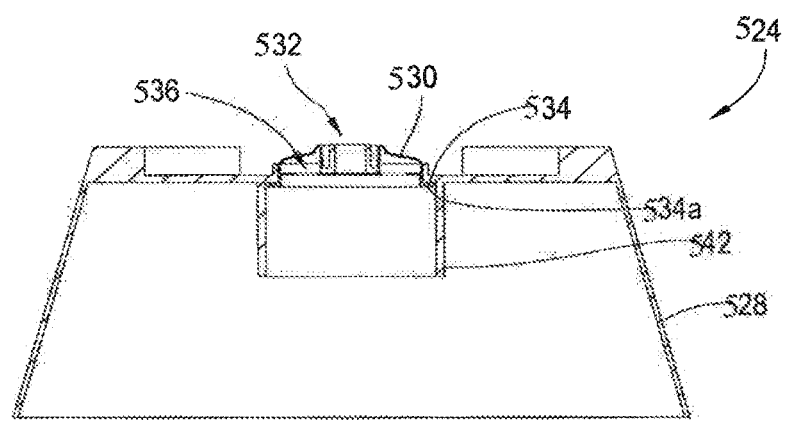
Figure 31:
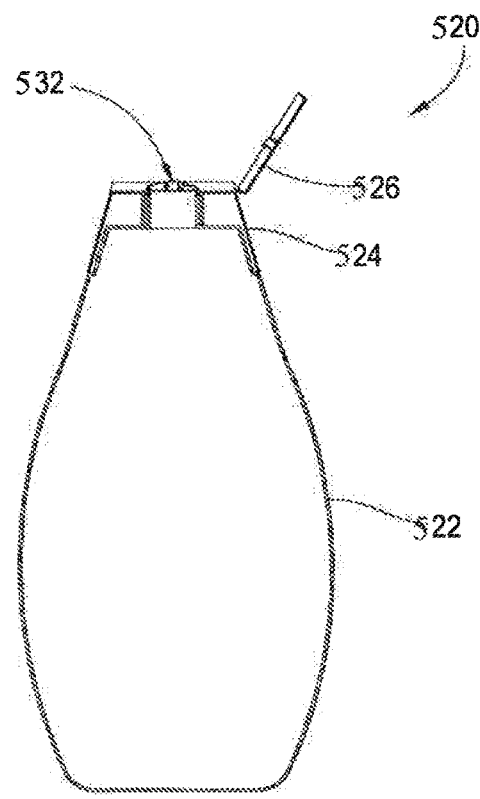
Figure 32:
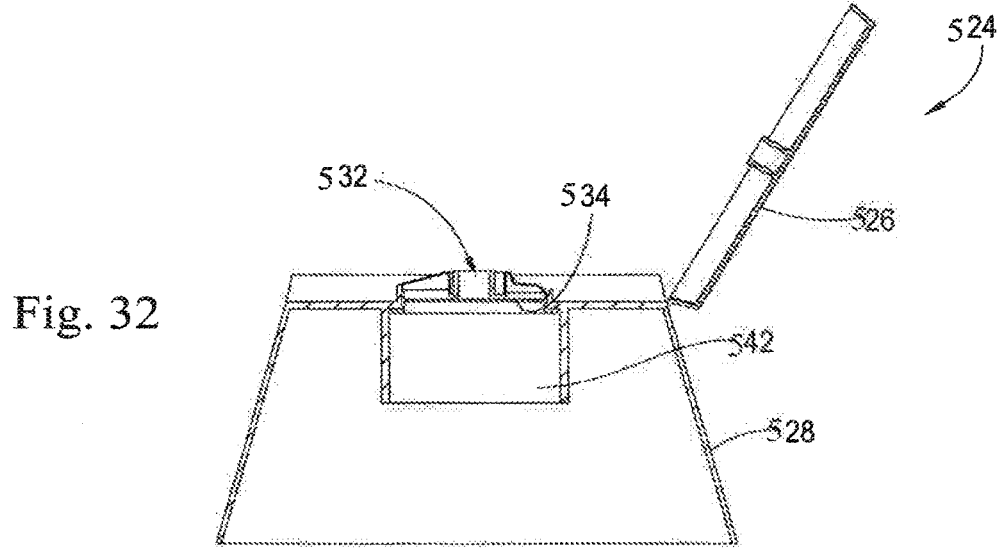

FIGS. 16 to 32 show an earlier embodiment of the general concept as disclosed in the earlier application referred to above, as follows:

FIG. 16 is a perspective view of a dispenser with a flip cap in an open condition;

FIG. 17 is a perspective view;

FIG. 18 is a left side elevational view;

FIG. 19 is a front elevational view;

FIG. 20 is a top plan view;

FIG. 21 is a left side perspective view of a closure which comprises one component part of the FIG. 16 dispenser;

FIG. 22 is a top perspective view of the closure;

FIG. 23 is a bottom perspective view of the closure;

FIG. 24 is a bottom perspective view of the closure;

FIG. 25 is an exploded view of the closure with its cooperating valve disc illustrated separately;

FIG. 26 is a top plan view of the closure;

FIG. 27 is a left side elevational view of the closure;

FIG. 28 is a front elevational view of the closure;

FIG. 29 is a rear elevational view, in full section, of the dispenser of FIG. 16;

FIG. 30 is an enlarged rear elevational view of the closure and valve disc subassembly associated with the dispenser;

FIG. 31 is a right side elevational view, in full section, of the dispenser, and FIG. 32 is an enlarged, right side elevational view of the closure and valve disc subassembly associated with the dispenser.

FIGS. 1 to 6 show a first dispensing closure embodying the invention. It comprises an outer cap element 3 and an inner element 4 or valve disc, each moulded in one piece from polypropylene. The outer element 3 includes a securing cap portion with a cylindrical side wall 31 having an inward thread 32 for engaging a container neck (not shown), and a top cap wall with an outer surround portion 34 of structural thickness, like the side wall 31, and a much thinner diaphragm wall 35 extending over most of the central region. The diaphragm wall 35 lies slightly higher than the surround wall 34, with a step portion between them presenting a snap formation 33 (FIG. 5) where the inner element 4 fixes in.

The diaphragm wall 35 is generally planar in the rest condition as shown, and has a central outlet opening 361 surrounded by a short, thicker surround tube or nozzle 36 which is axially directed, and presents an inwardly-facing flat edge face 362.

The inner element or valve disc 4 is circular and snaps up inside the outer element by means of a peripheral mounting ring portion 41 having an outwardly-directed snap formation 43 which engages in the corresponding formation 33 of the outer cap. Preferably, in the as-moulded form (before the two components are joined together) the diaphragm wall 35 is dished inwardly (downwardly) by several degrees relative to the assembled position shown. When the valve disc 4 is pushed in, it lifts the diaphragm wall 35 against its resilience to the position shown and pre-tensions the closure. Incidentally, the thickness of the diaphragm wall in the example may be about 0.3 mm.

Figure 1:
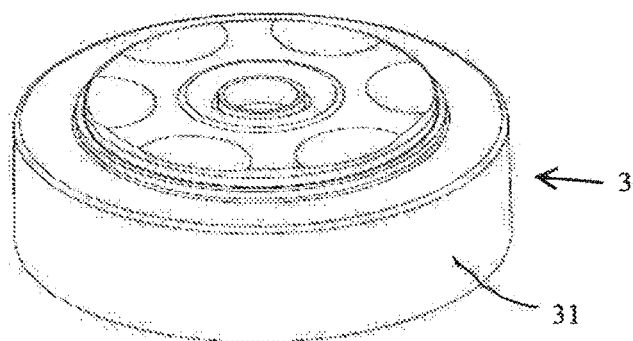
Figure 2:
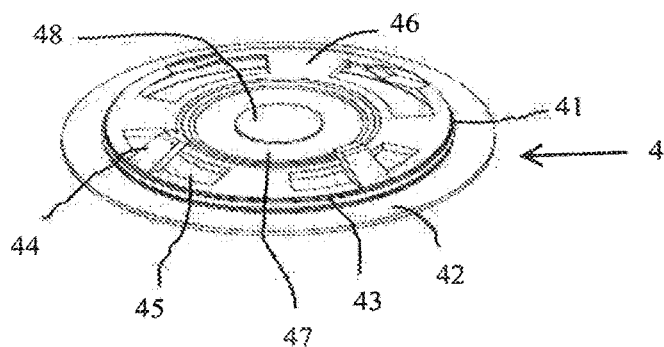
FIGS. 2, 3 and 4 are respectively a top view, side view and bottom (inside) view of the closure.
Figure 3:
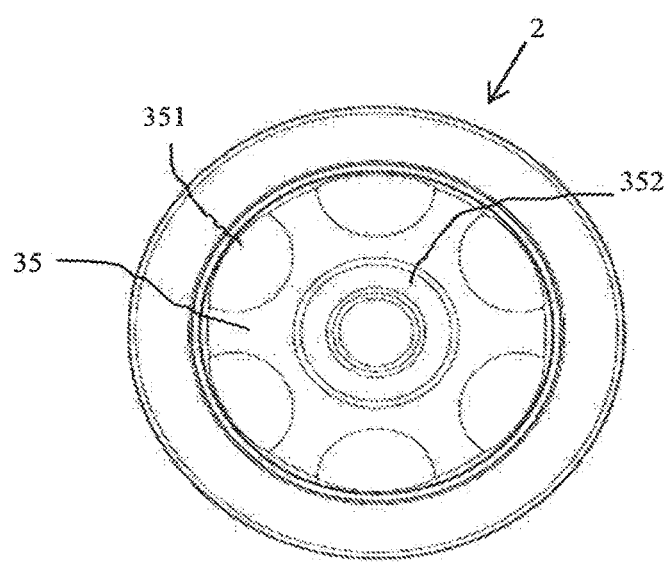
Figure 4:
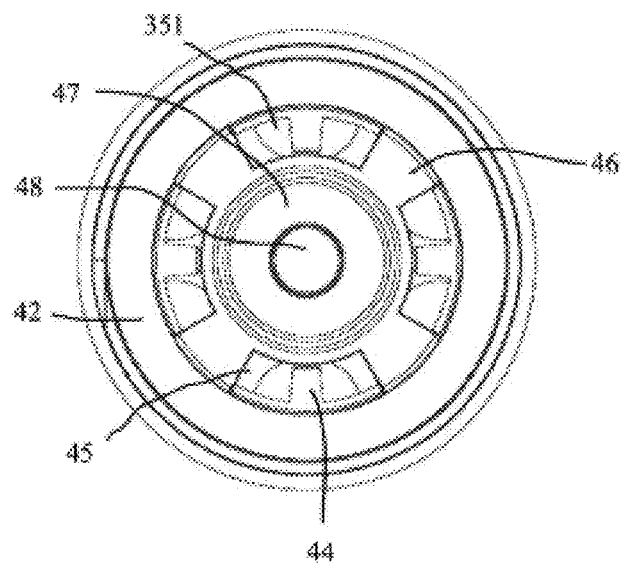
Figure 5:
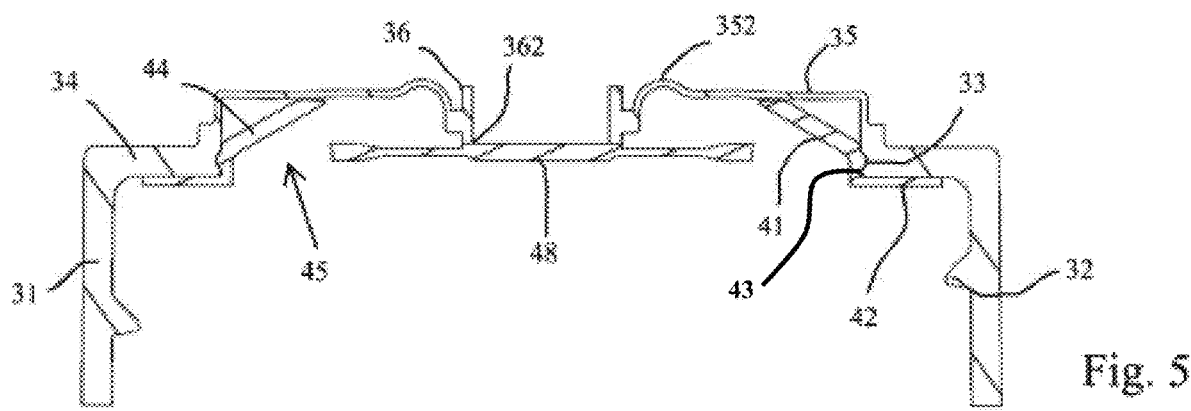
FIG. 5 is an enlarged diametric cross-section through the closure in the closed position.

Returning to the valve disc (inner element): an outer flange 42 projects out from around the bottom of the retaining ring 41 and engages the underside of the cap surround 34, improving the seal and location, and being engaged by the top edge of the container neck (not shown) when screwed on. With reference particularly to FIG. 1, the valve disc has a central disc portion 47 supported from the peripheral ring 41 through a set of narrow support spokes 46, spaced by flow openings 45. The centre of the inner disc portion 47 has a slightly upwardly projecting circular region 48 constituting a blocking portion, with a flat upper surface and annular periphery dimensioned to cover and close off the inner side of the outward opening as seen in FIG. 5. It will be understood that, because of the pre-tensioning mentioned above, there is some closure force in the axial direction between these components in the rest condition seen in FIG. 5, arising from slight deflection in the support spokes 46 balanced by slight deflection of the diaphragm wall.

Distributed around the upper periphery of the inner element, moulded integrally with it and projecting upwards at an incline, are a set of upward props 44 whose tips engage the undersurface of the diaphragm wall 35 (FIG. 5). The diaphragm wall 35 is generally flat and planar in this condition, but it is formed with a set of dished indentations 351 which increase its resistance to outward bending. Also, in the region around the central tube 36, the thin diaphragm wall is formed into an annular roll or part-torus formation 352 which acts as a stiffening form to prevent the central nozzle tube 36 from tilting away from the axial direction. This helps to ensure good sealing closure against the blocking portion 48.

The flow area provided by the openings 45 of the inner element is much larger than the flow area through the outlet openings 361. Accordingly, when liquid is to be dispensed by squeezing the container (and/or inverting it) the outward liquid pressure acts to bulge the diaphragm wall 35 outwardly as shown in FIG. 6(a), whereas the blocking portion 48 scarcely moves. This relative movement opens the outlet 361 for the outflow of product P. When the dispensing pressure is relieved, the squeeze container recovers and a negative pressure difference arises: see FIG. 6(b). The diaphragm wall 35 returns promptly to its flat start position, but deforms very little inwardly because it is held out by the props 44. The pressure difference therefore acts on the blocking portion 48 at the inlet opening and deflects it slightly inwardly (by flexion of the support spokes 46), and this allows air A and any liquid product present at the outlet to be sucked back into the container. Once the pressures equalise, the valve returns to the slightly tensioned closed position of FIG. 5.

FIGS. 7 to 13 show a second embodiment of closure valve 102 which in most particulars is the same as the first, so that corresponding reference numerals have been used for corresponding elements. A slight difference here is that the props 144 are larger and sturdier, and contoured at their tips to accommodate the indentations 351 of the diaphragm wall. Also the outer flange 42 of the inner valve element is not present (this flange is an enhancement in the first embodiment).

The specific difference is in the formation of the blocking portion 148 and the outward opening 361. Here, the surround tube 136 has an inwardly-directed sealing edge 148 somewhat similar to the first embodiment, but the outward end of this tube has an extension 137 forming a generally cylindrical nozzle. A vent actuator in the form of a cylindrical rod 149 projects forward from the outer face of the blocking portion 148, with which it is integrally moulded, up through the middle of the nozzle tube 137 and projecting slightly at the top. This closure is designed for use with toiletries having characteristic perfumes. With the dispenser (container and closure) standing upright, and without dispensing any product, the user can push with a finger on top of the actuating rod 149 and open the valve so that scented air from the interior can escape for sampling.

The various perspective and partly broken-away views of the second embodiment also illustrate the disposition of the components of the first embodiment, which are substantially similar. The materials for the second embodiment can be the same as in the first, and again the diaphragm wall 35 may be pre-tensioned by forming in the mould so that it is inwardly dished before assembly.

FIGS. 14 and 15 show dispensers in which the respective closures 2,102 of the first and second embodiments are secured onto the necks of squeezable plastics containers 1.

An alternative description of FIGS. 7 to 13, corresponding to that in U.S. provisional patent application 62/167,622 of 28 May 2015, the priority of which is claimed herein, is as follows.

Referring to FIGS. 7-13, a closure subassembly 102 is illustrated. Closure subassembly 102 includes a closure 3 and valve disc. The valve disc may be a single-piece, unitary, moulded plastic component which includes a vent structure represented in part by vent post 149. The closure may also be a single-piece, unitary, moulded plastic component which includes a product (nozzle) outlet 137 which also functions as guide sleeve for vent post 149. As with the assembly of closure and valve disc in the previous embodiment, the valve disc is preferably assembled into the closure with a snap-fit arrangement. Utilizing an interference fit with mutual engagement structures, it is an easy assembly step simply to snap the valve disc into the closure 3 as is illustrated. This particular snap-fit assembly creates an initial biasing of the valve disc into a closed condition against the lower opening of outlet 137.

The valve disc includes a plurality of flow openings 45, which may be in an annular pattern. In the exemplary embodiment each flow opening 45 has an arc shape. Each flow opening 45 is the result of creating a flap 144 which is deflected away from its corresponding opening 45. The valve disc includes four flow openings 45 which are generally equally spaced in an annular array around vent post 149.

When the valve disc is snapped into the closure 62, the centre portion 148 of the valve disc is biased into a secure closing and sealing position against the annular rib 362 at the inner end of the outlet 137. This biased arrangement seals off the flow of product for dispensing until the sealed interface between centre portions 148 and rib 362 is opened, at least in part. Since the closure 3 is not designed to move or deflect, the only option for creating a flow path is to somehow move or deflect valve disc. The movement of the valve disc off or away from rib 362 creates a flow path for the dispensing of product from within the container 22 out through outlet 137. Deflecting the valve disc away from rib 362 also creates an air vent path between the interior of the container and the atmosphere.

In a manner similar to what has been described for the previous embodiment, the closure subassembly 102 is adapted to dispense product. Once the closure subassembly is assembled to a suitable product-containing container, product is able to be dispensed via outlet 137 once sufficient (manual) squeezing pressure is applied to the sidewall of the container. As product is forced upwardly toward the closure subassembly, the flow paths for the product are through openings 45. The product, after flowing through the opening 45, has no immediately available flow path through outlet 137. The manual squeezing of the container has yet to see product dispensed and as that manual squeezing continues, the pressure builds up. As the pressure builds up, the valve disc is caused to deflect such that the centre portion 148 is moved away from annular rib 362, at least part, thereby creating a flow opening and thus a flow path into the interior of the outlet 137. As soon as the level of pressure which is sufficient for creating a flow path subsides to a lower pressure level, the biased design of the valve disc causes the flow path to close.

Centre portion 148 includes vent post 149. The outer end of the vent post 149 is slightly above the outer end of the outlet 137. The axial height difference or offset of these two outer ends is limited such that the post outer end is not at risk of being hit, caught, bent, broken, etc. By pushing axially downwardly on the post outer end towards the outlet outer end, the centre portion 148 is caused to move away from annular rib 362. This separation between centre portion 148 and annular rib 362 creates a small air vent, essentially in the same location as the flow path. However, in this case, product is not being pushed out of the container. Instead, there is simply an air flow path created between the interior of the container and the atmosphere. This air flow path allows a prospective purchaser to smell the scent of the product which is within the container. As soon as the axial pressure on vent post 149 is removed, the biased assembly of the valve disc into the closure 3 closes off the air vent.

The following description reproduces disclosure of the earlier application, for either technical support or exclusion as explained above.

A different style of closure is disclosed herein in the form of a valve structure incorporated into a closure for a container. In the disclosed form of the exemplary embodiment, the closure includes a valved nozzle for the control of product dispensing.

In these proposals a product dispenser includes a squeeze container and a cooperating closure which has a valved nozzle for the control of product dispensing. While a squeeze container is used for the exemplary embodiment, the principles of the valved nozzle are fully applicable whenever an interior pressure or fluid force is able to be created. It is this interior pressure or fluid force which causes the movement of one valve nozzle component relative to another valve nozzle component in order to open a flow path for the dispensing of product. The pressure or fluid force could be created by a piston pump mechanism in lieu of a squeeze container which is the selected construction for the exemplary embodiment. In the exemplary embodiment it is the force of the fluid product flowing against a surface of the one valved nozzle component which results in the opening of the fluid flow path for the dispensing of product.

The use of a squeeze container as the exemplary embodiment enables a focus on the closure construction without needing to focus on the manner of creating the valve-opening fluid force. As disclosed herein, the container is the component part responsible for the delivery of the requisite valve opening force (fluid pressure). The closure is attached to or received by the container by any suitable mechanism, such as by a snap-fit connection or by thread engagement, and the closure includes the valved nozzle which is constructed and arranged with two valve components. These two valve components are normally closed and the movement of one relative to the other opens a product flow path through the nozzle. The fluid flow path through the nozzle for dispensing of product is between the two valve components.

For the exemplary embodiment, lower cost plastics can be used, the component count is lower as compared to various prior art constructions and the disclosed dispenser is suitable for a variety of fluid products, including beverages and condiments. The closure construction of the exemplary embodiment permits the intake of make-up air back into the container when the squeezing force on the container is relaxed or removed and the container returns to or close to its initial condition.

Some general aspects of the proposals are set out in the following numbered clauses.

1. A dispenser for a fluid product comprising:
a container constructed and arranged for holding a supply of fluid product; and
a closure subassembly received by said container and providing an outlet opening for dispensing at least a portion of said supply of fluid product, said closure subassembly including a valve with a first valve component and assembled therewith a second valve component.

2. The dispenser of clause 1 wherein said valve is openable by said portion of said supply of fluid product.

3. The dispenser of any one of the preceding clauses wherein said closure subassembly includes a closure and said closure includes said first valve component.

4. The dispenser of any one of the preceding clauses wherein said second valve component is a valve disc.

5. The dispenser of clause 4 wherein said valve disc defines a product flow opening.

6. The dispenser of any one of the preceding clauses wherein said closure defines an outlet for directing said portion of said supply of fluid product to said outlet opening.

7. The dispenser of clause 6 wherein said outlet is a part of said first valve component.

8. The dispenser of clause 7 wherein said second valve component is constructed and arranged to close off one end of said outlet.

9. The dispenser of any one of the preceding clauses wherein said container is a squeeze container which is free of any separate pump mechanism.

10. The dispenser of any one of the preceding clauses wherein said closure is a single-piece, plastic component.

11. The dispenser of any one of the preceding clauses wherein said first valve component is constructed and arranged to flex in response to fluid pressure supplied by said portion of said supply of fluid product.

12. The dispenser of clause 11 wherein when said first valve component flexes a flow path for said portion of said supply of fluid product is created.

13. The dispenser of clause 12 wherein said created flow path is between said first valve component and said second valve component.

14. The dispenser of any one of the preceding clauses wherein said closure includes a flip cap for closing off said outlet opening.

15. The dispenser of clause 14 wherein said flip cap is hinged to the remainder of said closure as part of a single-piece construction for said closure.

16. A dispenser for a fluid product comprising:
a container constructed and arranged for holding a supply of fluid product;
a closure received by said container; and
a valve member which is assembled into said closure.

17. The dispenser of clause 16 wherein said closure is a single-piece component which defines a flow nozzle with an outlet through said flow nozzle.

18. The dispenser of any one of clauses 16 or 17 wherein said closure includes a cooperating valve component for engagement with said valve member to create an outlet control valve.

19. The dispenser of clause 18 wherein said cooperating valve component is constructed and arranged to flex in response to fluid pressure supplied by a portion of said supply of fluid product.

20. The dispenser of clause 19 wherein said valve member is constructed and arranged as a disc which defines a plurality of flow openings.

Further general options include the following.

The container may be a resiliently squeezable container and the dispenser a squeeze dispenser which dispenses the fluid product simply by squeezing the container.

The closure component which may comprise the first valve component may be in the form of a cap or lid which attaches to the container, e.g. by a snap or thread formation comprised in the closure component. All of these components, including a flexible part of the first valve component, which in turn may include or be part of a nozzle thereof, may be formed as one molded piece. The nozzle may have a central outlet tube surrounded by a resiliently flexible membrane portion. This membrane portion may have plural facets.

The second valve component may have a closed or impermeable region which lies beneath the outlet opening of the nozzle, to meet and close it when the nozzle is in a rest position.

The closure may comprise a sleeve formation in which or by which a valve disc, as the second valve component, is held in position. A valve disc as the second valve component may define a central closed region for closing the outlet and peripheral clearance for product flow, e.g. a set of flow openings through the disc.

Referring to FIGS. 16 to 20, there is illustrated a dispenser 520 according to an exemplary embodiment. Dispenser 520 includes a container 522 and a closure 524 which is attached to the container 522. The closure 524 includes a hinged flip cap 526 and a closure body which defines nozzle 530. The nozzle 530 defines an outlet 532 for dispensing product which is held in container 522. The subassembly which is attached to dispenser 520 includes not only closure 524 but a valve disc 534 which is assembled into closure 524. Further, a small projection 526a is formed as an integral part of flip cap 526 and is inserted into and used to close off outlet 532 when dispenser 520 is not in use.

In the exemplary embodiment the closure 524 may be fabricated from a polymer such as polypropylene. The valve disc 534 may also be fabricated out of polypropylene. Accordingly, these two components may be fabricated out of the same polymer whether or not polypropylene is selected.

In the exemplary embodiment of FIG. 16, closure 524 is constructed and arranged with a cooperating snap-fit feature with a similar and cooperating structure for the container 522 so that these two components can be snapped together for the completion of dispenser 520, noting that closure 524 would include the referenced valve disc 534 as part of the closure subassembly. While other connection structures, features and techniques are contemplated, such as having a threaded connection between the closure and the container, the key is that there is a secure connection between the closure 524 and the container 522, regardless of the specific construction technique which is selected. With a secure connection between the closure 524 and container 522, the interior pressure due to squeezing of the flexible container will not cause the closure 524 to come off or disengage from the container 522.

Assembled into closure 524, as explained, is a valve disc 534 (see FIG. 23). Valve disc 534 is a relatively thin, generally circular member with an annular array of clearance openings 536 which function as flow apertures for product. These flow apertures allow the product coming from within the container to pass through valve disc 534 and engage a portion of the nozzle 530 which ultimately causes that nozzle to flex and thereby creates a clearance path for that same portion of product to flow through outlet 532 and thereby be dispensed. The valve disc 534 is a molded plastic (single piece) component with six equally spaced openings 536. As shown in FIG. 25, valve disc 534 includes a raised, outer annular lip 534a on one face. The closure 524 is a single-piece, molded plastic component which is formed (i.e. molded) with the nozzle 530 and the flip cap 526 as well as a living hinge 538 which joins the flip cap 526 to the closure body 528.

The upper panel 540 of closure body 528 includes a depending sleeve 542 which is generally concentric with the outer periphery of nozzle 530. This sleeve 542 extends axially inwardly toward the interior of the container 522 and provides a generally cylindrical space for the receipt of valve disc 534. One option for the assembly of valve disc 534 into sleeve 542 is by means of suitable bumps, projections, ribs and/or detents such that the valve disc 534 snaps into sleeve 542 in a securely retained fashion, axially positioned beneath nozzle 530, see FIGS. 29 to 32. Another option, considering the plastic construction of valve disc 534 and the plastic construction of sleeve 542, is to use an interference fit and simply press fit the valve disc 534 into position.

Referring to FIGS. 21 to 28, the structural details of the closure 524, the flip cap 526, the nozzle 530, the valve disc 534 and the sleeve 542 are illustrated. The upper panel 540 includes a recessed center area 544 which is surrounded, in part, by two raised arc-like sections 546,548. Clearance notches 550,552 are created by this construction and the projecting portions 554,556 of flip cap 526 fit into notches 550,552, respectively, in order to provide a flush appearance for the top of closure 524 when the flip cap 526 is closed.

The combination of closure 524 and valve disc 534 creates a valve structure (closure subassembly) for the management of product dispensing from container 522. The entire dispenser is shown in full section form in FIGS. 29 and 31 with different geometric cutting planes for each of those two views. The enlarged detail drawings of FIGS. 30 and 32 focus on the valve structure following the same two geometric cutting planes.

Sleeve 542 extends down from upper panel 540 and is an integrally molded portion of closure 524. The nozzle 530 defines outlet 532 and valve disc 534, which has a solid enclosed center portion 545, is positioned (snap-in or press-in fit), up against the interior face of outlet 532 thereby closing off outlet 532. In the exemplary embodiment, nozzle 530 is an integrally molded part of closure 524. This means that the closing structure for container 522 includes two components which are assembled into the closure subassembly. These two component parts include the closure 524 and the valve disc 534.

When the container is squeezed with sufficient force to dispense product, the portion of product to be dispensed flows upwardly through openings 536. The product then contacts an inner surface of nozzle 530 which surrounds outlet 532. As can be seen in the drawings, the nozzle 530 may comprise a central outlet tube surrounded by a resiliently outwardly-deformable, outwardly convex membrane portion moulded integrally with the rest of the closure component 524. The membrane portion has plural facets. The force of the product flow which is directed against the inner surface of nozzle 530 causes a slight deflection of the nozzle and as a result, the nozzle bows upwardly with a slight convex contour or more convex contour on the outer facing surface of the nozzle. As the inner facing surface of the nozzle becomes slightly concave or slightly more concave, a corresponding result of this described bowing, a clearance space is created between the interior face of outlet 532 and the valve disc 534 thereby allowing product to flow through this clearance space and to be dispensed. As the container returns to its initial shape, a suction force (negative pressure) replaces the positive pressure within the container. This suction force pulls the valve disc 534 away from the outlet 532 so that make-up air can enter the container by way of outlet 532. This then restores the dispenser 520 back to a ready condition for its next dispensing cycle. The flow of make-up air can assist in blowing back into the container residual product which may have been left on or around the two valve components. [The repeat of the earlier application ends here.]

A further option herein, and in the context of the earlier application—but not disclosed in the earlier application, and part of the present later proposals—is as follows.

The types of products to be dispensed may include health and beauty aid products where the scent of the product may be a factor in the purchasing decision. When a container is closed or otherwise enclosed in some manner, such as by an outer wrapping, the prospective purchaser is likely unable to smell or assess the scent of the product until after purchase. It would be an answer to this type of issue if a vent structure could be provided so that when the structure is opened, the prospective purchaser is able to smell the scent of the product, all prior to purchase. One embodiment of the present invention provides such a vent structure.

This embodiment of the present invention further includes, as a part of the valving construction, a biased-closed vent structure which can be manually opened. When this vent structure is opened a prospective purchaser is able to smell the scent of the produce which is housed within the container prior to purchase of that product and without needing to open the container.

In this proposal a dispenser of any one of the proposals herein further includes an air vent structure. The air vent structure may include a vent post.

The invention claimed is:

1. A dispensing closure for a squeezable container, the closure comprising:
   an integrally formed outer cap having a cylindrical outer wall extending downward from a flexible diaphragm forming a generally flat and planar top wall of the outer cap, said top wall including an outlet aperture within a central portion and said cylindrical wall including retaining formations;
   an inner element comprising a central disc, a central blocking portion, and at least one flow opening to permit fluid to flow through the inner element;
   wherein the flexible diaphragm temporarily flexes away from the inner element in response to dispensing pressure; and
   wherein the inner element engages the outer cap with sufficient axial force so that the central blocking portion seals the outlet aperture when the dispensing pressure is not applied to the flexible diaphragm.

2. The closure of claim 1 further comprising cooperating snap formations provided on the outer cap and the inner element.

3. The closure of claim 1 wherein the central blocking portion is positioned concentrically within a plurality of flow openings.

4. The closure of claim 3 wherein at least one support spoke is positioned between the flow openings.

5. The closure of claim 4 wherein an outer flange is positioned along a peripheral edge of the inner element, said outer flange sealing the inner element to the top wall.

6. The closure of claim 1 wherein the outlet aperture is positioned concentrically within a plurality of dished indentations formed in the flexible diaphragm.

7. The closure of claim 1 wherein the blocking portion includes a cylindrical rod extending upward through the outlet aperture.

8. The closure of claim 7 wherein the cylindrical rod is positioned concentrically within and spaced apart from a surround tube attached to the top wall and extending upward from the outlet aperture.

9. The closure of claim 7 wherein a flat wall of the blocking portion encircles the cylindrical rod, said flattened wall engaging a rib formation on the top wall to seal the outlet aperture.

10. The closure of claim 7 wherein at least one prop formation projects upward from the central disc, said prop formation engaging the top wall when dispensing pressure is applied so as to define the flow opening.

11. The closure of claim 10 wherein the central blocking portion is positioned concentrically within a plurality of prop formations.

12. The closure of claim 10 wherein the prop formation is formed integrally with a retaining ring attached to a top surface of the inner element.

13. The closure of claim 1 wherein at least one prop formation projects upward from the central disc, said prop formation engaging the top wall when dispensing pressure is applied so as to define the flow opening.

14. The closure of claim 13 wherein the central blocking portion is positioned concentrically within a plurality of prop formations.

15. The closure of claim 13 wherein the prop formation is formed integrally with a retaining ring attached to a top surface of the inner element.

16. The closure of claim 1 wherein an outer flange is positioned along a peripheral edge of the inner element, said outer flange sealing the inner element to the top wall.

* * * * *